United States Patent
Pawar et al.

(10) Patent No.: US 12,242,977 B2
(45) Date of Patent: Mar. 4, 2025

(54) EXTRACTION OF TASKS FROM DOCUMENTS USING WEAKLY SUPERVISION

(71) Applicant: Tata Consultancy Services Limited, Mumbai (IN)

(72) Inventors: Sachin Sharad Pawar, Pune (IN); Girish Keshav Palshikar, Pune (IN); Anindita Sinha Banerjee, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 292 days.

(21) Appl. No.: 17/812,748

(22) Filed: Jul. 15, 2022

(65) Prior Publication Data

US 2023/0229936 A1 Jul. 20, 2023

(30) Foreign Application Priority Data

Dec. 15, 2021 (IN) .............................. 202121058475

(51) Int. Cl.
*G06F 40/211* (2020.01)
*G06F 40/117* (2020.01)
(Continued)

(52) U.S. Cl.
CPC ............ *G06N 5/022* (2013.01); *G06F 40/117* (2020.01); *G06F 40/205* (2020.01);
(Continued)

(58) Field of Classification Search
CPC ..... G06N 5/022; G06F 40/117; G06F 40/205; G06F 40/253; G06F 40/284; G06F 40/289; G06F 40/211; G06F 40/279; G06F 40/30
See application file for complete search history.

(56) References Cited

U.S. PATENT DOCUMENTS

| 9,449,080 | B1 * | 9/2016 | Zhang ................. G06F 16/3346 |
| 10,489,462 | B1 * | 11/2019 | Rogynskyy ............. H04L 12/14 |
| 2023/0111052 | A1 * | 4/2023 | Ray ....................... G06F 40/242 704/9 |

(Continued)

OTHER PUBLICATIONS

Sen Yangy et al., "Exploring Pre-trained Language Models for Event Extraction and Generation," 57th Annual Meeting of the Association for Computational Linguistics, 2019, ACL Anthology, https://aclanthology.org/P19-1522.pdf.

(Continued)

*Primary Examiner* — Pierre Louis Desir
*Assistant Examiner* — Kristen Michelle Masters
(74) *Attorney, Agent, or Firm* — Finnegan, Henderson, Farabow, Garrett & Dunner, LLP (57) ABSTRACT

This disclosure relates to extraction of tasks from documents based on a weakly supervised classification technique, wherein extraction of tasks is identification of mentions of tasks in a document. There are several prior arts addressing the problem of extraction of events, however due to crucial distinctions between events-tasks, task extraction stands as a separate problem. The disclosure explicitly defines specific characteristics of tasks, creates labelled data at a word-level based on a plurality of linguistic rules to train a word-level weakly supervised model for task extraction. The labelled data is created based on the plurality of linguistic rules for a non-negation aspect, a volitionality aspect, an expertise aspect and a plurality of generic aspects. Further the disclosure also includes a phrase expansion technique to capture the complete meaning expressed by the task instead of merely mentioning the task that may not capture the entire meaning of the sentence.

13 Claims, 5 Drawing Sheets

(51) Int. Cl.
  *G06F 40/205*   (2020.01)
  *G06F 40/253*   (2020.01)
  *G06F 40/279*   (2020.01)
  *G06F 40/284*   (2020.01)
  *G06F 40/289*   (2020.01)
  *G06F 40/30*    (2020.01)
  *G06N 5/022*    (2023.01)

(52) U.S. Cl.
  CPC .......... *G06F 40/253* (2020.01); *G06F 40/284* (2020.01); *G06F 40/289* (2020.01)

(56) References Cited

U.S. PATENT DOCUMENTS

2023/0135659 A1* 5/2023 Wu ..................... G06N 3/044
                                                   706/21

OTHER PUBLICATIONS

Chen Liangy et al., "BOND: BERT-Assisted Open-Domain Named Entity Recognition with Distant Supervision Title of the item: Computation and Language," Jun. 2020, Arxiv, https://arxiv.org/pdf/2006.15509.pdf.

Haoran Wang, "Evaluating a joint neural model with global features for document-level end-to-end information extraction," Theses, 2021, Scholars' Bank, https://www.cs.uoregon.edu/Reports/MS-202106-Wang.pdf.

Yu Meng et al., "Text Classification Using Label Names Only: A Language Model Self-Training Approach," Computation and Language, Oct. 2020, Arxiv, https://arxiv.org/pdf/2010.07245.pdf.

* cited by examiner

FIG. 5

EXTRACTION OF TASKS FROM DOCUMENTS USING WEAKLY SUPERVISION

PRIORITY CLAIM

This U.S. patent application claims priority under 35 U.S.C. § 119 to: India Application No. 202121058475 filed on 15 Dec. 2021. The entire contents of the aforementioned application are incorporated herein by reference.

TECHNICAL FIELD

The disclosure herein generally relates to extraction of tasks from documents, and, more particularly, to a method and a system for extraction of tasks from documents using weakly supervision.

BACKGROUND

With the advancement of digital technology, the digital content available has increased exponentially. Considering the increased digital content, several techniques of Natural Language Processing (NLP) are gaining importance due to NLP's ability to detect, analyze and process massive volumes of text data across the digital world. There are several interesting analyses of digital content that can be carried out using NLP of which extraction of tasks from large corpora is yet to be explored.

Extraction of tasks has several useful applications such as tasks extracted from resumes capture the fine-grained experience of a candidate and would be useful for automatically shortlisting candidates for a certain job requirement. Another interesting application of the extraction of tasks and their corresponding roles is to automatically augment common sense knowledge.

The problem of extraction of tasks is to automatically identify mentions of tasks in a document. Syntactically, a task can be mentioned as a verb phrase or as a noun phrase in a sentence. However, certain aspects of the task are also to be included while performing the extraction of tasks such as tasks usually demand some skill and expertise, and tasks are carried out volitionally.

Further the problem of extraction of tasks is not explicitly addressed, while there are several prior arts addressing the problem of extraction of events. Although events are similar to tasks in some respects, there are certain crucial distinctions between events and tasks such as a task requires expertise to be performed while an event can happen without any expertise, and hence it is important to define and address task extraction as a separate problem. Since extraction of tasks has several applications, there is a requirement for Artificial Intelligence (AI) based techniques to address the requirement as the extraction of tasks is still largely unexplored.

SUMMARY

Embodiments of the present disclosure present technological improvements as solutions to one or more of the above-mentioned technical problems recognized by the inventors in conventional systems. For example, in one embodiment, a system for training a word-level data model for extraction of tasks from documents using weakly supervision is provided. The system includes a memory storing instructions, one or more communication interfaces, and one or more hardware processors coupled to the memory via the one or more communication interfaces, wherein the one or more hardware processors are configured by the instructions to receive a plurality of documents from a plurality of sources, via one or more hardware processors. The system is further configured to pre-process the plurality of documents using a plurality of pre-processing techniques, via the one or more hardware processors, to obtain a plurality of pre-processed documents comprising a plurality of sentences, a plurality of words within the plurality of sentences, a plurality of Part-of-speech (POS) tags, a plurality of dependency trees and a plurality of wordnet based features. The system is further configured to label the plurality of words from the plurality of pre-processed documents as one of a task headword and a no-task headword, via the one or more hardware processors, wherein the plurality of words is labelled based on the plurality of sentences using a plurality of linguistic rules. The system is further configured to train a word-level weakly supervised classification model for extraction of tasks, via the one or more hardware processors, using the task headword and the no-task headword labelled using the plurality of linguistic rules.

In another aspect, a method for training a word-level data model for extraction of tasks from documents using weakly supervision is provided. The method includes receiving a plurality of documents from a plurality of sources. The method further includes pre-processing the plurality of documents using a plurality of pre-processing techniques to obtain a plurality of pre-processed documents comprising a plurality of sentences, a plurality of words within the plurality of sentences, a plurality of Part-of-speech (POS) tags, a plurality of dependency trees and a plurality of wordnet based features. The method further includes labelling the plurality of words from the plurality of pre-processed documents as one of a task headword and a no-task headword, via the one or more hardware processors, wherein the plurality of words is labelled based on the plurality of sentences using a plurality of linguistic rules. The method further includes training a word-level weakly supervised classification model for extraction of tasks, via the one or more hardware processors, using the task headword and the no-task headword labelled using the plurality of linguistic rules.

In yet another aspect, a non-transitory computer readable medium for training a word-level data model for extraction of tasks from documents using weakly supervision is provided. The program includes receiving a plurality of documents from a plurality of sources. The program further includes pre-processing the plurality of documents using a plurality of pre-processing techniques to obtain a plurality of pre-processed documents comprising a plurality of sentences, a plurality of words within the plurality of sentences, a plurality of Part-of-speech (POS) tags, a plurality of dependency trees and a plurality of wordnet based features. The program further includes labelling the plurality of words from the plurality of pre-processed documents as one of a task headword and a no-task headword, via the one or more hardware processors, wherein the plurality of words is labelled based on the plurality of sentences using a plurality of linguistic rules. The program further includes training a word-level weakly supervised classification model for extraction of tasks, via the one or more hardware processors, using the task headword and the no-task headword labelled using the plurality of linguistic rules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Task extraction is a process of identification of mentions of a "task" in a document. Syntactically, the task can be mentioned as a verb phrase (example: implemented a model for weather prediction) or as a noun phrase (example: model implementation for weather prediction) in a sentence. Further during task extraction, the extent of a task mention should be such that the complete meaning expressed by the task should be captured. In an example scenario, from the sentence "The researcher implemented a model for weather prediction", complete meaning expressed by the task should be captured even though the shorter phrase implemented "a model" is a valid task mention but does not capture the entire meaning.

The state-of-the-art techniques do not explicitly perform task extraction, however there are several prior arts performing "event extraction". Considering an existing state-of-art technique—Event extraction by Xiang and Wang, 2019, an event is defined as a specific occurrence of something happening in a certain time and place which involves one or more participants and can often be described as a change of state. Although events are similar to tasks in some respects, there are certain crucial distinctions that are to be considered to differentiate the task with the event and hence it is important to define and address task extraction as a separate problem. The similarities-distinctions between tasks and events in several aspects including a non-negation aspect, a tense aspect, a genericity aspect, a modality aspect. The several aspects along with a note on similarities-distinctions between tasks and events are listed below:

(a) Non-Negation Aspect:

Events should be explicitly mentioned as having occurred and typically there is no direct negation used to describe an event. Tasks are also similar to events in this aspect. Considering an example scenario: "He did not implement the solution", neither an event nor a task is mentioned.

(b) Tense Aspect:

Events must be in the past or present tense. However, tasks describe a general category as against specific events which describe a specific occurrence such as "L&T engineers built this bridge". In event extraction, only specific events are considered whereas tasks can be generic events.

(c) Modality Aspect:

Only realistic events which have actually occurred are considered as events. All other modalities such as belief, hypothesis, desire is not considered event but these can be considered as tasks. In the sentence "Engineers are supposed to build bridges which last for years", a task build bridges is mentioned but it is not an event.

A task is a well-defined knowledge-based action carried out volitionally with expertise for a specific goal within a pre-defined time by a single person, a group of persons, a device, or a system. However, based on the definition of a task and on the above listed aspects—the volitionally and the expertise aspects are not explicitly covered.

Further the inventors have attempted to perform task extraction based on linguistic patterns. One of the advantages, with linguistic patterns for task extraction is that there is no need for any training data. The linguistic patterns for task extraction define an action noun & an action verb from the sentences. However, linguistic pattern extraction has several disadvantages that include: the presence of action verbs or nouns is just a necessary condition and not a sufficient condition for extraction of tasks. Further, the two important aspects of tasks volitionality and need for expertise are not checked explicitly. Moreover, there is a challenge of polysemy which is not handled explicitly. A verb (or noun) may be an action verb (or an action noun) in one particular sense but may not be an action verb (or action noun) in another sense. For example, "synthetic data generation" is a valid task but "next generation of chip technology" is not a valid task because of different senses of the noun generation. Hence based on the discussed existing state of art which is also a previous work of the inventors—the volitionally and the expertise aspects along with the addressing the challenge of polysemy should be addressed for efficient task extraction. Further during task extraction, the extent of a task mention should be such that the complete meaning expressed by the task should be captured considering the sentence and should not be mentioned with just extracted "task". Hence the disclosure is an improvisation of the inventor's previous research on task extraction using linguistic patterns, as the disclosure addresses all the challenges faced during the linguistic patterns technique.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
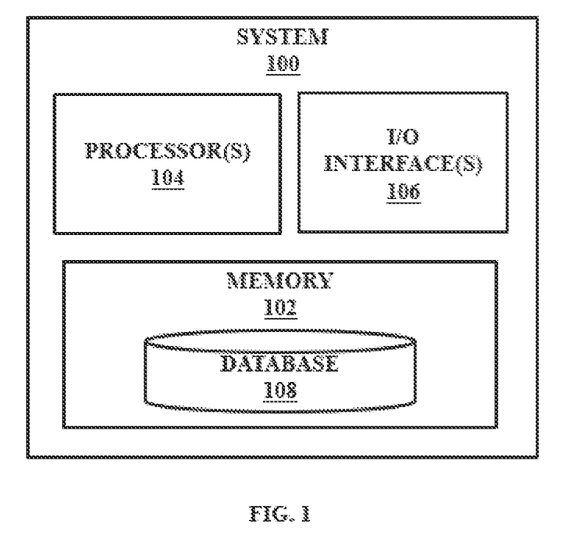
FIG. 1 illustrates an exemplary system for extraction of tasks from documents using weakly supervision according to some embodiments of the present disclosure.

FIG. 1 is an exemplary block diagram of a system 100 for extraction of tasks from documents using weakly supervision in accordance with some embodiments of the present disclosure. The task extraction is identification of mentions of a task in a document, wherein a task is a well-defined knowledge-based action carried out volitionally with expertise for a specific goal within a pre-defined time by a single person, a group of persons, a device, or a system.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding extraction of tasks, labelling of words, performing pre-processing of received documents. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
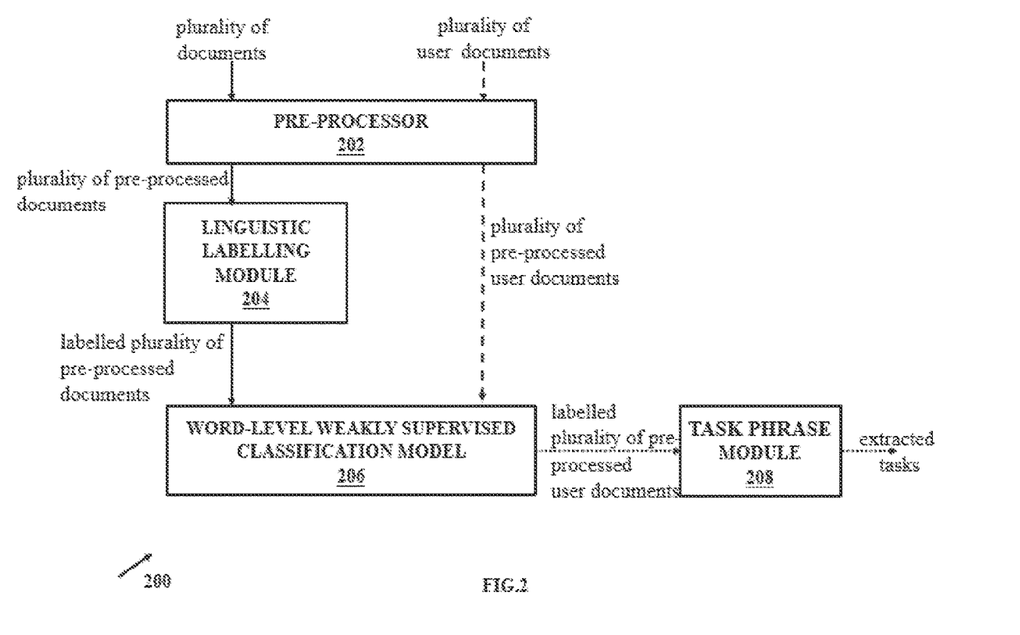
FIG. 2 is a functional block diagram of a system for extraction of tasks from documents using weakly supervision according to some embodiments of the present disclosure.
Figure 3:
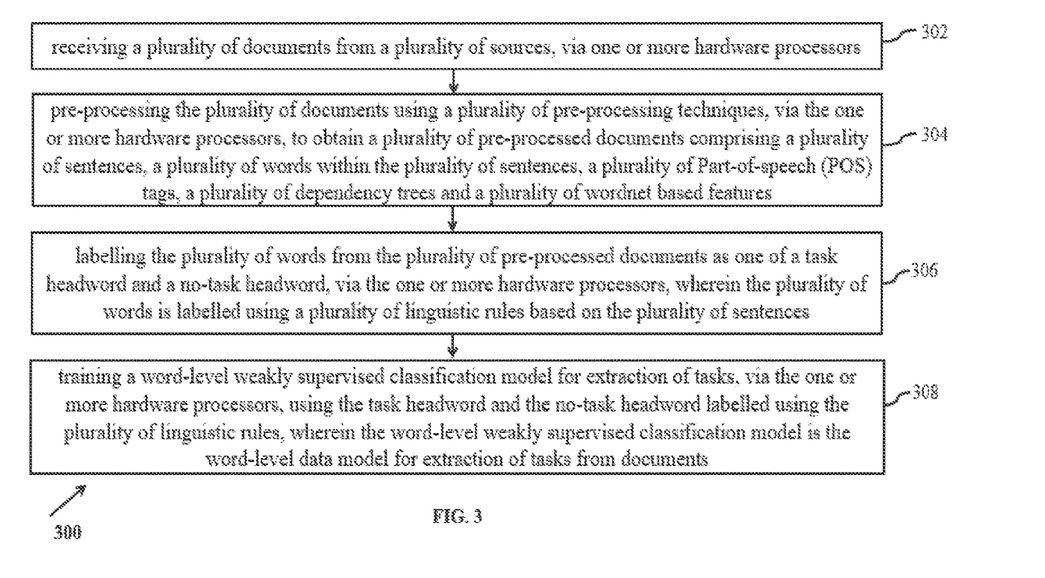
FIG. 3 is a flow diagram illustrating a method (300) for training a word-level data model for extraction of tasks from documents using weakly supervision in accordance with some embodiments of the present disclosure.

Functions of the components of system 100 are explained in conjunction with functional overview of the system 100 in FIG. 2 and flow diagram of FIG. 3 for extraction of tasks from documents using weakly supervision.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an example functional block diagram of the various modules of the system of FIG. 1, in accordance with some embodiments of the present disclosure. As depicted in the architecture, the FIG. 2 illustrates the functions of the modules of the system 100 that includes extraction of tasks from documents using weakly supervision.

The system 200 for extraction of tasks from documents using weakly supervision functions in two phase—a training phase and a testing phase based on a user requirement. The training phase comprises of training a word-level weakly supervised classification model for extraction of tasks. The testing phase comprises of using the word-level weakly supervised classification model for extraction of tasks. Hence in the training phase the word-level weakly supervised classification model is generated and trained, and in the testing phase the generated word-level weakly supervised classification model is used for performing the task extraction of user documents. The extraction of tasks from documents is based on weakly supervision, wherein the word-level weakly supervised classification model is trained by creating a labeled training dataset based on the plurality of sentences using a plurality of linguistic rules.

During the training mode, the system 200 for extraction of tasks from documents using weakly supervision is configured to receive a plurality of documents from a plurality of sources, via one or more hardware processors 104. During the testing mode, the system 200 is configured to receive the plurality of user documents for the extraction of tasks, via one or more hardware processors 104.

The system 200 further comprises a pre-processor 202 configured for pre-processing the plurality of documents using a plurality of pre-processing techniques, to obtain a plurality of pre-processed documents. The plurality of pre-processed documents comprises a plurality of sentences, a plurality of words within the plurality of sentences, a plurality of Part-of-speech (POS) tags, a plurality of dependency trees and a plurality of wordnet based features. During the testing mode, the pre-processor 202 configured to pre-process the plurality of user documents using the plurality of pre-processing techniques to obtain a plurality of pre-processed user documents. The plurality of pre-processed user documents comprises a plurality of user sentences and a plurality of user words within the plurality of user sentences.

The system 200 further comprises a linguistic labelling module 204 configured for labelling the plurality of words from the plurality of pre-processed documents. Each of the plurality of words is labelled as one of a task headword and a no-task headword, wherein the plurality of words is labelled based on the plurality of sentences using a plurality of linguistic rules. The labelled plurality of words is used as training data.

The system 200 further comprises a word-level weakly supervised classification model 206, which is a word-level weakly supervised classification model trained for extraction of tasks during the training phase. The word-level weakly supervised classification model is trained using the task headword and the no-task headword labelled using the plurality of linguistic rules. During testing mode, the word-level weakly supervised classification model 206 is configured for labelling the plurality of user words from the plurality of pre-processed user documents. The plurality of pre-processed user documents is labelled as one of a task headword and a no-task headword using the word-level weakly supervised classification model.

The system 200 further comprises a task phrase module 208 configured for expanding the labelled user task headword to obtain a task phrase. The task phrase is obtained based on a phrase expansion technique and the plurality of dependency trees, wherein the task phrase represents the extracted task.

The various modules of the system 100 and the functional blocks in FIG. 2 are configured for extraction of tasks from documents using weakly supervision are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIG. 3. The FIG. 3 with reference to FIG. 1, is an exemplary flow diagram illustrating a method 300 for extraction of tasks from documents using weakly supervision using the system 100 of FIG. 1 according to an embodiment of the present disclosure.

The steps of the method of the present disclosure will now be explained with reference to the components of the system (100) for extraction of tasks from documents using weakly supervision and the modules (202-208) as depicted in FIG. 2 and the flow diagrams as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300 a plurality of documents is received from a plurality of sources, via one or more hardware processors 104.

In an embodiment, the plurality of documents includes any textual data. In an example scenario, the plurality of documents includes resumes, news articles, user manuals, product reviews, patent documents, etc., Further the plurality of sources includes sources that produces or publishes the textual documents. In an example scenario, the plurality of sources includes newspaper organizations for new articles, patent websites for patent documents etc., At step 304 of the method 300, the plurality of documents is pre-processed using a plurality of pre-processing techniques at the pre-processor 202. The plurality of pre-processed documents comprises a plurality of sentences, a plurality of words within the plurality of sentences, a plurality of Part-of-speech (POS) tags, a plurality of dependency trees and a plurality of wordnet based features.

The plurality of pre-processing techniques to obtain the plurality of pre-processed documents comprises:
(a) a sentence-splitting technique for identification of the plurality of sentences,
(b) a tokenization technique for identification of the plurality of words within the plurality of sentences,
(c) a Part of speech (POS) tagging technique for identification of the plurality of Part-of-speech (POS) tags for each word in the plurality of words,
(d) a dependency parsing technique for identification of the plurality of dependency tree for the plurality of sentences, and a WordNet based features identification technique for identification of the plurality of wordnet based features for the plurality of sentences In an embodiment, an example scenario of a document from a plurality of documents, pre-processed the document using the plurality of pre-processing techniques to obtain the plurality of pre-processed documents is shared below:

```
================================================
Document:
================================================
Amazon has said the number of demands for user data made by U.S.
federal and local law enforcement have increased more during the first
half of 2020 than during the same period a year earlier. The disclosure
came in the company's latest transparency report, published Thursday.
================================================
After Sentence-splitting and Tokenization:
================================================
Sentence 1: Amazon has said the number of demands for user data
made by U.S. federal and local law enforcement have increased more
during the first half of 2020 than during the same period a year earlier.
Sentence 2: The disclosure came in the company's latest transparency
report, published Thursday.
================================================
POS-tagging and Dependency parsing (information is shown embedded
through XML-like tags, however a complex data structure is used to
store this information for each sentence):
================================================
Sentence1:
nsubj_said><DVP_said><DNP_amazon><ORG><NNP>Amazon
</NNP></ORG></DNP_amazon></nsubj_said><DVP_has><VBZ>has
</VBZ></DVP_has><VBN>said
</VBN><nsubj_increased><DVP_increased><DNP_number><DT>the
</DT><NN>number         </NN><prep_of_number><IN>of
</IN><pobj_of><DNP_demands><NNS>demands
</NNS><prep_for_demands><IN>for
</IN><pobj_for><DNP_data><NN>user        </NN><NNS>data
</NNS><DVP_made><VBN>made    </VBN><prep_by_made><IN>by
</IN><pobj_by><DNP_enforcement><DNP_u.s.><GPE><NNP>U.S.
</NNP></GPE></DNP_u.s.><JJ>federal            </JJ><CC>and
</CC><JJ>local     </JJ><NN>law        </NN><NN>enforcement
</NN></DNP_enforcement></DNP_data></DNP_demands></DNP_n
umber></DVP_made></pobj_by></prep_by_made></pobj_for></prep
_for_demands></pobj_of></prep_of_number></nsubj_increased><DV
P_have><VBP>have          </VBP></DVP_have><VBN>increased
</VBN><RBR>more       </RBR><prep_during_increased><IN>during
</IN><pobj_during><DNP_half><DATE>DT>the       </DT>JJ>first
</JJ><NN>half     </NN><prep_of_half><IN>of       </IN><CD>2020
</CD></DATE></DNP_half></prep_of_half></pobj_during></prep_dur
ing_increased><prep_than_increased><IN>than      </IN><IN>during
</IN><pobj_during><DNP_period><DATE><DT>the </DT><JJ>same
</JJ><NN>period    </NN><DNP_year><DT>a     </DT><NN>year
</NN></DNP_year><RBR>earlier
</RBR></DATE></DNP_period></DVP_increased></pobj_during></pr
ep_than_increased><.>. </.></DVP_said>
Sentence 2: <nsubj_came><DVP_came><DNP_disclosure><DT>The
</DT><NN>disclosure
</NN></DNP_disclosure></nsubj_came><VBD>came
</VBD><prep_in_came><IN>in
</IN><pobj_in><DNP_report><DNP_company><DT>the
</DT><NN>company                                </NN><POS>'s
</POS></DNP_company><JJS>latest         </JJS><NN>transparency
</NN><NN>report
</NN></DNP_report></pobj_in></prep_in_came><,>,
</,><DVP_published><VBD>published
</VBD><DNP_thursday><DATE><NNP>Thursday
</NNP></DATE></DNP_thursday></DVP_published><.>.
</.></DVP_came>
================================================
WordNet-based Features:
================================================
said : WordNet hypernym depth = 2; WordNet corpus frequency = 1861
published : WordNet hypernym depth = 6; WordNet corpus frequency =
39
...
Similarly these features are computed for other words in the sentences.
================================================
```

At step 306 of the method 300, the plurality of words from the plurality of pre-processed documents is labeled by the linguistic labelling module 204. The labelling process includes labelling each of the plurality of words as one of a task headword and a no-task headword. The plurality of words is labelled based on the plurality of sentences, wherein the word is labelled in the context of the sentence (in which the word is appearing) using the plurality of linguistic rules.

Hence the labelling process identifies the task headword and the no-task headword. The task headword for each sentence among the plurality of sentences is the word which determines the syntactic category (e.g., noun phrase, verb phrase) of a phrase, wherein the phrase is a smaller sub-set of two or more words within a sentence. Considering a dependency tree of the sentence, the task headword in a sentence among the plurality of sentences is the governor whereas all other words in the phrase are directly or indirectly dependent on the head word. Hence considering few example scenarios—for (a) for the phrase "data analysis", the word "analysis" is labeled as the task headword and the word "data" is labeled as the no-task headword, (b) for the phrase "installing a new software", the word "installing" is labeled as the task headword and "a new software" is labeled as the no-task headword.

In an embodiment, the plurality of words is labelled based on the plurality of linguistic rules for labelling the for a non-negation aspect, a volitionality aspect, an expertise aspect and a plurality of generic aspects. The volitionality aspect further includes an action verbs or nouns aspect, an animate organization agent aspect, an inanimate agent aspect and a volition marker. The plurality of generic aspects includes several aspects, however for explanation purposes a few aspects as considered such as a presence of direct object aspect, an adjectival clause modifier aspect, a compound noun modifier aspect and a number-like modifier aspect. The plurality of linguistic rules is not limited to above mentioned aspects but can include more aspects and rules, however for explanation purposes the above aspects are explained in below sections.

The plurality of linguistic rules for labelling the non-negation aspect labels the plurality of words based on a modification by a negation using the dependency tree.

In an embodiment, if a word 'w' is modified by any negation indicating word that includes a "not" or "never" through dependency relation neg in the dependency tree, then the word is labelled as "task headword". Considering an example scenario—"They did not develop any weather prediction model", then other ways of expressing negation such as failed to develop, or absence of development is considered.

The plurality of linguistic rules for labelling the volitionality aspect labels the plurality of words based on identification of actions carried out volitionally. The volitionality aspect refers to tasks whose actions are carried out by an actor volitionally. For example, "The bridge collapsed" is an event but it is not a task because the action of collapsing is not carried out volitionally by any actor.

The volitionality aspect includes several aspects such as the action verbs or nouns aspect, the animate organization agent aspect, the inanimate agent aspect and the volition marker.

In an embodiment, volitionality aspect comprises a volition marker and non-volition marker. The volition marker: If a verb w is modified by an adverb (dependency child with relation advmod) explicitly indicating volition, then the word is labelled as "task headword". In an example scenario for volition indicating adverbs are deliberately, voluntarily, intentionally in the sentence—"He voluntarily engages in self-developmental activities", wherein the word "engages" is labelled as the task headword. Further for non-volition marker: If the verb w is modified by an adverb explicitly indicating non-volition, then the word is labelled as "no task headword". Examples of non-volition indicating adverbs are accidentally, unintentionally as used in the example scenario of—"He accidentally pressed the send button.", wherein the word "pressed" is labelled as the task headword.

Further for the action verbs or nouns aspect—if the word w is not an action verb or noun then then the word is labelled as "no task headword". Here, the sentence context is not used and the decision is only based on the word w. In an example scenario—nouns such as book, culture and verbs such as situate, lack are not labelled as "task headword".

Further for the animate organization agent aspect—If the agent (dependency child with relation nsubj or agent) of the verb w is animate or corresponds to some organization, then the word is labelled as "task headword". The animate organization agent aspect captures volitionality in an implicit way as the animate agents (or organizations) indicate that the action corresponding to verb w is likely to be carried out volitionally. Here, animate/organization agents are those words which are—(a) personal pronouns like he, she, we, (b) named entities of type PERSON or ORGANIZATION, or (c) person or organization indicating common nouns like engineer, farmer, department (these words have person or organization as their ancestors in WordNet hypernym tree). Example: "Any overseas data demands are screened by the department", wherein the word "screened" is labelled as the task headword.

Further for the inanimate agent aspect—If the agent of the verb w is inanimate, then the word is labelled as "no task headword". The inanimate agent aspect captures the opposite characteristics as compared to the animate organization agent aspect. The heuristic is that if any action is carried by an inanimate agent, then it is unlikely to be a task. Here, inanimate agents are those words which are—(a) event indicating nouns (e.g., storm, pandemic) or (b) natural objects or substances (e.g., stone, water). Again, lists of such words are created using WordNet hypernym structure. E.g., "The coronavirus pandemic accelerated the shift to e-commerce." wherein the word "accelerated" is labelled as the task headword.

The plurality of linguistic rules for labelling the expertise aspect labels the plurality of words based on a domain expertise or knowledge required for execution of the task. Unlike events, for tasks an important factor is that the task requires some domain expertise or knowledge by the actor for execution. For example, John entered the restaurant is an event but not a task.

In an embodiment, the expertise aspect labels include analyzing the plurality of sentences for labelling based on an explicit expertise marker, an expertise score using corpus statistics, which is explained below:

The explicit expertise marker: If the word w occurs in explicit expertise indicating context in the dependency tree (DT), then then the word is labelled as "task headword". One of the key characteristics of a task is the requirement for a certain domain expertise to be executed. The expertise indicating context can be—(a) w being modified by an adjectival clause headed by using or leveraging, or (b) w being preposition phrase modifying nouns/verbs such as knowledge of or expertise in. In an example scenario: "You can dynamically deliver language files to your mobile apps using SDKs", wherein the word "deliver" is labelled as a task headword.

Expertise score using corpus statistics: If the word w has high expertise score based on the corpus statistics then the word is labelled as "task headword". The expertise score based on a corpus statistic does not use the sentence context for the word w, but an expertise score is computed for each action noun and verb using statistics from a large corpus, and then the top 100 action verbs and nouns are chosen using the expertise score. For each action verb and noun, the expertise score is computed as follows:

$$ExpScore(w) = \log(N_w^e + 1) \times \frac{N_w^e}{N_w} \quad (1)$$

where, $N_w$: No. of times the word w appears in the corpus; and
$N_w^e$: No. of times the word w appears in the explicit expertise indicating context The expertise score for a word will be high if both of the following conditions are true: i) the conditional probability of observing it in expertise indicating context is high, and ii) the absolute frequency with which it appears in expertise indicating context is high. In an example scenario: "The Fosters will develop media like podcasts and videos" and "The work involves experimental investigation of droplet impingement over a heated surface." wherein the words "develop" and "investigation" are labelled as a task headwords.

The plurality of generic aspects includes several aspects, however for explanation purposes a few aspects are considered such as a presence of direct object aspect, a adjectival clause modifier aspect, a compound noun modifier aspect and a number-like modifier aspect. The plurality of linguistic rules is not limited to above mentioned aspects but can include more aspects and rules.

The presence of direct object aspect—If the word w has a direct object (dobj) or a passive subject (nsubjpass) then the word is labelled as "task headword". For actions expressed using nouns, prepositional phrase headed by of is considered similar to a direct object (implemented the solution) implementation of the solution). Here, the heuristic is that the presence of direct object (or passive subject for passive voice verbs) for an action verb increases likelihood of it being a more meaningful task. Example: "It recently published a handbook"; "The post was restricted on social media" and "It asks user for selection of a particular webpage", wherein the words "published", "restricted" and "selection" are labelled as task headwords. However, if the verb w does not have any direct object, passive subject, or any prepositional modifier, then then the word is labelled as "no-task headword". Thus, capturing the opposite characteristic as compared to the presence of direct object aspect, with the heuristic that such verbs are unlikely to constitute meaningful tasks. Example: "It allows the VM to begin operating quickly", wherein the words "operating is labelled as task headwords.

Further for the adjectival clause modifier aspect: If the verb w is a head word of an adjectival clause modifying some noun, then the word is labelled as "no task headword". Here, the heuristic is that such verbs simply provide extra information about a noun and are unlikely to be tasks. Considering an example scenario—"It left thousands of sensitive health records exposed to the internet" there is no task here, however the word "exposed" is labelled as "no-task headword".

Further for the compound noun modifier aspect: If the noun w modifies another noun as a compound modifier, then the word is labelled as "no task headword". Considering an example scenario: "Rivian sets a delivery date" there is no task here, however the word "delivery" is labelled as "no-task headword".

Further for the number-like modifier aspect: If the noun w is modified by a number, an ordinal, a cardinal, or a number-like modifier like next, then the word is labelled as "no task headword". Considering an example scenario—"The solutions that the first generation of clean tech investors backed were economically unfeasible" there is no task here, however the words "generation" is labelled as "no-task headword".

At step 308 of the method (300), a word-level weakly supervised classification model 206 is trained for extraction of tasks. The word-level weakly supervised classification model 206 is trained using the task headword and the no-task headword labelled using the plurality of linguistic rules.

In an embodiment, the word-level weakly supervised classification model 206 is a BERT-based classification model. The BERT-based classification model is trained using the task headword and the no-task headword labelled using the plurality of linguistic rules. Each instance is annotated with soft labels, wherein each instance is a combination of a word w, the word's POS tag p, and the sentence S (where the word is present). The instance is annotated with soft labels with a probability distribution as $y_{gold} \in \mathbb{R}^2$.

The architecture of the BERT-based classification model includes an embedded representation $x \in \mathbb{R}^{768}$ for the word w using a pre-trained BERT transformer model as shown below:

$$x_w = \text{BERT}(S, w) \quad (2)$$

Further a linear feed-forward layer is included to get a more compressed representation $x' \in \mathbb{R}^{10}$ Of the word as shown below:

$$x_w' = \text{ReLU}(Wx + b) \quad (3)$$

Here, are $W \in \mathbb{R}^{10 \times 768}$ and $b \in \mathbb{R}^{10}$ learnable weights. The word representation is compressed to lower dimensions to enable additional features of POS tagging and WordNet-based features described below without overwhelming the BERT model:

(a) POS tag: Part of speech tag of the word w is a key feature because a task head word of a task can only be a noun or verb. The embedded representation $x_p \in \mathbb{R}^5$ of the POS tag of w is enabled using an Embedding layer with learnable weights $\mathbb{R}^{N_p \times 5}$ where $N_p$ is the number of distinct POS tags).

WordNet-based features: One of the main feature of task is presence of more specific words than generic words. Hence, two WordNet-based features are implicitly used to estimate specificity of the word w—i) Hypernym depth and ii) Corpus frequency. Hypernym depth of a word is the number of levels in the hypernym tree between that word and the root (entity in case of all nouns). The higher the hypernym depth, the higher is its specificity. E.g., hypernym depth of diagnosis is 8 which is higher as compared to a more generic word action with hypernym depth of 5. Similarly, lower the corpus frequency of a word, higher is its specificity. For each word, a WordNet-based features vector is used $x_{wn} \in \mathbb{R}^2$ Overall representation of the word w, $h_w \in \mathbb{R}^{17}$ is now concatenation of $x_w'$, $x_p$, and $x_{wn}$. The WordNet-based features vector is then passed through the final classification layer to get the predicted label $y_{pred} \in \mathbb{R}^2$.

$$h_w = \text{Concatenate}([x_w'; x_p; x_{wn}]) \quad (4)$$

$$y_{pred} = \text{Softmax}(W'h_w + b') \quad (5)$$

$$\text{loss} = \text{KLDLoss}(y_{gold}, y_{pred}) \quad (6)$$

Here, $W' \in \mathbb{R}^{10 \times 768}$ and $b \in \mathbb{R}^{10}$ are learnable weights. The predicted label distribution is then compared with the gold standard or expected distribution $y_{gold}$ to compute KL divergence loss which is backpropagated during the training process. We also fine-tune the final encoder layer of BERT.

The word-level weakly supervised classification model 206 is trained for extraction of tasks. In the training phase the word-level weakly supervised classification model 206 is generated and trained, and in the testing phase the generated word-level weakly supervised classification model 206 is used for performing the task extraction of user documents. The task extraction of user documents is performed at the word-level weakly supervised model 206 for the plurality of user documents based on a word-level weakly supervision task extraction technique.

Figure 4:
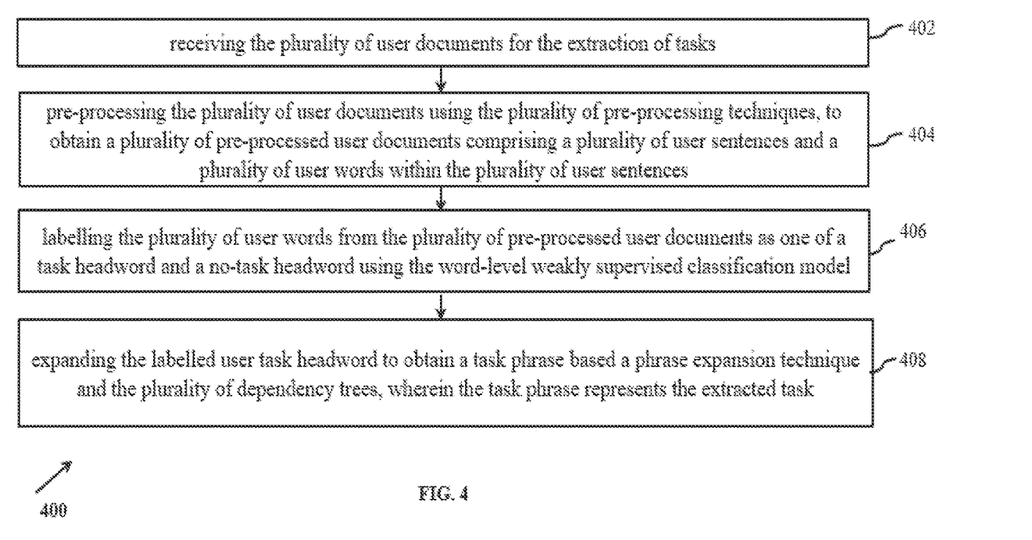
FIG. 4 is a flow diagram illustrating a method (400) for extraction of tasks using a word-level weakly supervision task extraction technique in accordance with some embodiments of the present disclosure.

In an embodiment, the method for weakly supervision task extraction technique for extraction of tasks from the plurality of user documents is explained using flowchart of 400 as depicted in FIG. 4. The weakly supervision task extraction technique comprises:

At step 402 of the method (400), the plurality of user documents are received for the extraction of tasks via one or more hardware processors 104.

In an embodiment, the plurality of user documents includes any textual document shared by a user for extraction of tasks. In an example scenario, the plurality of user documents includes resumes, patents, product review, newspaper articles etc., At step 404 of the method (400), the plurality of user documents is pre-processed using the plurality of pre-processing techniques, to obtain a plurality of pre-processed user documents in the pre-processor 202. The plurality of pre-processed user documents comprises a plurality of user sentences and a plurality of user words within the plurality of user sentences. The plurality of pre-processed user documents also includes a plurality of user Part-of-speech (POS) tags, a plurality of user dependency trees and a plurality of user wordnet based features.

The plurality of pre-processing techniques to obtain the plurality of user pre-processed documents comprises the sentence-splitting technique, the tokenization technique, the Part of speech (POS) tagging technique, the dependency parsing technique and the WordNet based features identification technique. Hence the pre-processing techniques remains the same for both the plurality of user documents and the plurality of documents.

At step 406 of the method (400), the plurality of user words from the plurality of pre-processed user documents is labelled by the word-level weakly supervised classification model 206. The labelling includes as one of a task headword and a no-task headword using the word-level weakly supervised classification model 206.

In an embodiment, the trained BERT-based classification model includes an embedded representation $x \in \mathbb{R}^{768}$ for the word w using a pre-trained BERT transformer model as shown below:

$$x_w = \text{BERT}(S, w) \quad (2)$$

Further the linear feed-forward layer is included to get a more compressed representation $x' \in \mathbb{R}^{10}$ Of the word as shown below:

$$x_w' = \text{ReLU}(Wx + b) \quad (3)$$

Here, $W \in \mathbb{R}^{10 \times 768}$ and $b \in \mathbb{R}^{10}$ are trained learnable weights.

For each word, the WordNet-based features vector is used $x_{wn} \in \mathbb{R}^2$ Overall representation of the word w, $h_w \in \mathbb{R}^{17}$ is now concatenation of $x_w'$, $x_p$, and $x_{wn}$. The WordNet-based features vector is then passed through the final classification layer to get the predicted label $y_{pred} \in \mathbb{R}^2$.

$$h_w = \text{Concatenate}([x_w'; x_p; x_{wn}]) \quad (4)$$

$$y_{pred} = \text{Softmax}(W'h_w + b') \quad (5)$$

Here, $W' \in \mathbb{R}^{10 \times 768}$ and $b \in \mathbb{R}^{10}$ are weights learnt during the training.

At step 408 of the method (400), the labelled user task headword is expanded to obtain a task phrase. The user task headword is expanded to obtain a task phrase based on a phrase expansion technique and the plurality of dependency trees, wherein the task phrase represents the extracted task.

In an embodiment, a phrase expansion technique comprises a set of rules that are used to expand the head words to phrases using the dependency tree of the sentence. The phrase corresponding to a subtree with the dependency rooted at the task head word is obtained to discard certain dependencies. A set of dependency children are collected starting from the task head word and the task phrase is obtained from the leftmost child to the rightmost child. However, the dependency child connected to its parent with certain dependency relations are not considered and hence do not recurse on such children further. Dependency relations that are discard are:
  i) nsubj, agent (because task phrase does not contain the agent who executed the task);
  ii) relcl, advcl, ccomp, appos (to avoid getting complete dependent clauses or appositives describing extra information inside a task phrase);
  iii) aux, auxpass (for not including auxiliary verbs in task phrases).

Figure 5:
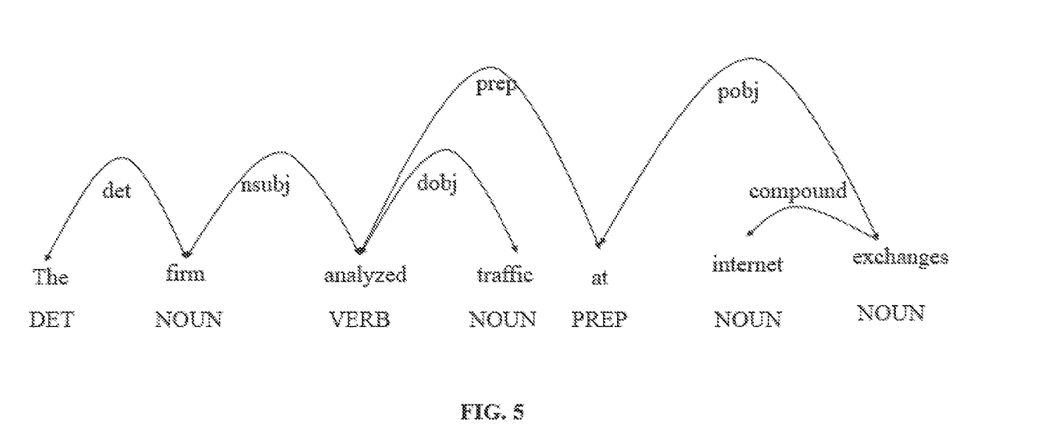
FIG. 5 illustrates an example task head word analysis from a sentence for extraction of tasks from documents using weakly supervision, by the system of FIG. 1, in accordance with some embodiments of the present disclosure.

In an example scenario as illustrated in FIG. 5, consider the task head word analyzed from the sentence. Here, the expanded task phrase is analyzed traffic at internet exchanges. Here, firm is excluded because its dependency relation nsubj is discarded, but other dependency children of analyzed are included recursively.

Finally the expanded task phrase representing the extracted task is displayed on the I/O interface(s) 106.

EXPERIMENTS

An experiment has been conducted evaluate the task extraction performance, by choosing four datasets from different domains:
  (a) Resumes: Set of resumes of candidates shared with our organization.
  (b) TechCrunch4: Articles from technical domain published on TechCrunch in 2020.
  (c) Reuters: A collection of 10,788 documents from the Reuters financial newswire service from the well-known Reuters-21578 corpus.
  (d) Patents: Abstracts of patents assigned to an organization in the years 2000-2019 which are scraped from Google Patents.

The training data for the word level BERT-based task extraction model is generated automatically using the Snorkel framework based on several labeling functions described. Further from the 4 datasets (250 documents from each)—Resumes, TechCrunch, Reuters, and Patents, 1000 documents are randomly chosen. The dataset consists of 19268 sentences where 98044 words (verbs and nouns) are assigned soft labels using Snorkel's labeling model, of which 98044 words, 21892 words were labeled as likely TASK head words, i.e., they were assigned TASK probability greater than 0:5. For all the remaining words in these sentences, NOT-TASK headword is considered as a hard label. The table.1 illustrated below shows various statistics of these labeling functions on this training data.

TABLE 1

Analysis of labeling functions over training dataset

| Labeling function | Cov | Overlap | Conflict |
|---|---|---|---|
| non action nouns/verbs | 0.625 | 0.625 | 0.0000 |
| negation modifier | 0.63 | 0.629 | 0.006 |
| animate/org agent | 0.68 | 0.667 | 0.021 |
| non-animate agent | 0.638 | 0.634 | 0.01 |
| volition marker | 0.625 | 0.625 | 0.0000 |
| non-volition marker | 0.625 | 0.625 | 0.0000 |
| explicit expertise marker | 0.629 | 0.629 | 0.001 |
| corpus expertise score | 0.673 | 0.66 | 0.013 |
| direct object | 0.799 | 0.687 | 0.013 |
| adjectival clause | 0.799 | 0.687 | 0.013 |
| no object or pp | 0.708 | 0.651 | 0.029 |
| compound modifier | 0.641 | 0.625 | 0.0000 |
| number-like modifier | 0.625 | 0.625 | 0.0000 |

Further, to create ground truth for evaluating various task extraction techniques, 20 documents from each of the 4 datasets are manually annotated with gold-standard task head words and complete task phrases, wherein the ground truth dataset consists of 1869 sentences where 607 tasks are annotated as shown below in Table.2:

TABLE 2

Details of ground truth dataset

| Dataset | Sentences | Tasks |
|---|---|---|
| Resumes | 1297 | 167 |
| TechCrunch | 292 | 251 |
| Reuters | 178 | 89 |
| Patents | 102 | 100 |
| Total | 1869 | 607 |

For purpose of performance comparison, recent event extraction techniques are used as baselines. The first event extraction technique—"EvExtB1" is a literary event extraction technique which is trained on literature dataset using a BiLSTM based model which used BERT token representations. The second event extraction technique—"EvExtB2" is an Open Domain Event Extraction technique that uses a BiLSTM based supervised event detection model which is trained on distantly generated training data. For both the event extraction techniques, event triggers identified are considered as task head words and complete task phrases are identified using the phrase expansion rules. Any gold-standard task phrase is counted as a true positive (TP) if there is a "matching" predicted task, otherwise it is counted as a false negative (FN). Here, two task phrases are considered to be "matching" if there is at least 80% string similarity between them for strict evaluation and 50% for lenient evaluation. All the remaining predicted tasks which are not TPs, are counted as false positives (FP). In addition, similar to event triggers, TPs, FPs and FNs are computed considering only task head words. Precision, recall and F1-score are then computed for each of these three evaluation strategies—strict evaluation, lenient evaluation and considering only task head words:

$$P = \frac{TP}{TP + FP} + \frac{TP}{TP + FP} + \frac{2.P.R}{+R} \quad (7)$$

where,

P represents Precision,

TP represents a true positive,

FN represents a false negative, and

FP represents a false positive.

The techniques for task extraction using the method 200—weakly supervised BERT-based task extractor, is experimented on 4 different datasets using 3 evaluation strategies. The performance of the proposed techniques (BERT extractor) is compared with two event extraction baselines (EvExtB1 and EvExtB2) and the inventor's previous work of linguistic patterns. The detailed result is shared in the

TABLE 3

Detailed result of comparative task extraction performance

| Dataset | Technique | Only task headword | | | Lenient evaluation | | | Strict evaluation | | |
|---|---|---|---|---|---|---|---|---|---|---|
| | | P | R | F1 | P | R | F1 | P | R | F1 |
| Resumes | EvExtB1 | 0.553 | 0.166 | 0.255 | 0.380 | 0.103 | 0.162 | 0.314 | 0.086 | 0.136 |
| | EvExtB2 | 0.335 | 0.669 | 0.447 | 0.373 | 0.714 | 0.490 | 0.232 | 0.454 | 0.307 |
| | Linguistic pattern | 0.582 | 0.771 | 0.663 | 0.551 | 0.730 | 0.628 | 0.429 | 0.568 | 0.488 |
| | disclosed technique | 0.552 | 0.675 | 0.607 | 0.505 | 0.589 | 0.544 | 0.311 | 0.368 | 0.337 |
| TechCrunch | EvExtB1 | 0.354 | 0.222 | 0.273 | 0.343 | 0.229 | 0.274 | 0.217 | 0.144 | 0.173 |
| | EvExtB2 | 0.312 | 0.763 | 0.442 | 0.294 | 0.734 | 0.419 | 0.187 | 0.476 | 0.268 |

TABLE 3-continued

Detailed result of comparative task extraction performance

| Dataset | Technique | Only task headword | | | Lenient evaluation | | | Strict evaluation | | |
|---|---|---|---|---|---|---|---|---|---|---|
| | | P | R | F1 | P | R | F1 | P | R | F1 |
| Reuters | Linguistic pattern | 0.404 | 0.510 | 0.451 | 0.420 | 0.542 | 0.473 | 0.239 | 0.310 | 0.270 |
| | disclosed technique | 0.449 | 0.732 | 0.556 | 0.422 | 0.694 | 0.524 | 0.262 | 0.439 | 0.328 |
| | EvExtB1 | 0.323 | 0.370 | 0.345 | 0.294 | 0.364 | 0.325 | 0.139 | 0.170 | 0.153 |
| | EvExtB2 | 0.188 | 0.716 | 0.297 | 0.188 | 0.761 | 0.302 | 0.095 | 0.386 | 0.152 |
| Patents | Linguistic pattern | 0.210 | 0.358 | 0.265 | 0.218 | 0.364 | 0.272 | 0.122 | 0.205 | 0.153 |
| | disclosed technique | 0.314 | 0.716 | 0.436 | 0.296 | 0.682 | 0.412 | 0.161 | 0.375 | 0.225 |
| | EvExtB1 | 0.533 | 0.075 | 0.132 | 0.556 | 0.085 | 0.148 | 0.267 | 0.034 | 0.061 |
| | EvExtB2 | 0.371 | 0.774 | 0.502 | 0.370 | 0.752 | 0.496 | 0.179 | 0.385 | 0.244 |
| Average | Linguistic pattern | 0.420 | 0.472 | 0.444 | 0.515 | 0.590 | 0.550 | 0.220 | 0.248 | 0.233 |
| | disclosed technique | 0.524 | 0.830 | 0.642 | 0.522 | 0.803 | 0.633 | 0.268 | 0.419 | 0.327 |
| | EvExtB1 | 0.441 | 0.208 | 0.251 | 0.393 | 0.195 | 0.227 | 0.234 | 0.109 | 0.131 |
| | EvExtB2 | 0.302 | 0.731 | 0.422 | 0.306 | 0.740 | 0.427 | 0.173 | 0.425 | 0.243 |
| | Linguistic pattern | 0.404 | 0.528 | 0.456 | 0.426 | 0.557 | 0.481 | 0.253 | 0.333 | 0.286 |
| | disclosed technique | 0.460 | 0.738 | 0.560 | 0.436 | 0.692 | 0.528 | 0.251 | 0.400 | 0.304 |

The Table.3, wherein except in the Resumes dataset, the BERT-based task extractor outperforms all other techniques on all the datasets. Considering the macro-average across datasets, the BERT-based task extractor turns out to be the best overall technique which also performs consistently across datasets. Further ablation analysis is also conducted to evaluate contribution of POS tag and WordNet-based features and observed that these features have minor positive contribution.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provide a solution to an unsolved problem of extraction of tasks from documents, wherein extraction of tasks is identification of mentions of tasks in a document. The disclosure for extraction of tasks is based on word-based weakly supervision. There are several prior arts addressing the problem of extraction of events, however due to crucial distinctions between events-tasks, task extraction stands as a separate problem. The disclosure explicitly defines specific characteristics of tasks, creates labelled data at a word-level based on a plurality of linguistic rules, which is used to train a word-level weakly supervised model for task extraction. The labelled data is created based on the plurality of linguistic rules for a non-negation aspect, a volitionality aspect, an expertise aspect and a plurality of generic aspects. Further the disclosure also includes a phrase expansion technique to capture the complete meaning expressed by the task instead of merely mentioning the task that may not capture the entire meaning of the sentence.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for training a word-level data model for extraction of tasks from documents using weakly supervision comprising:
   receiving a plurality of documents from a plurality of sources, via one or more hardware processors;
   pre-processing the plurality of documents using a plurality of pre-processing techniques, via the one or more hardware processors, to obtain a plurality of pre-processed documents comprising a plurality of sentences, a plurality of words within the plurality of sentences, a plurality of Part-of-speech (POS) tags, a plurality of dependency trees and a plurality of WordNet® based features;
   labelling the plurality of words from the plurality of pre-processed documents as one of a task headword and a no-task headword, via the one or more hardware processors, wherein the plurality of words is labelled based on the plurality of sentences using a plurality of linguistic rules, wherein the plurality of words is labelled based on the plurality of linguistic rules for a volitionality aspect referring to tasks whose actions are carried out by an actor volitionally,
   wherein the volitionality aspect includes an action verbs or nouns aspect, an animate organization agent aspect, an inanimate agent aspect and a volition marker,
   wherein the animate organization agent aspect captures the volitionality in an implicit way as animate agents indicate that the action corresponding to verb w is likely to be carried out volitionally,
   wherein for the animate organization agent aspect, when the agent of the verb w is animate or corresponds to an organization, then the word is labelled as "task headword", wherein for the inanimate agent aspect, when the agent of the verb w is inanimate, then the word is labelled as "no task headword"; and
   training a word-level weakly supervised classification model for extraction of tasks, via the one or more hardware processors, using the task headword and the no-task headword labelled using the plurality of linguistic rules, wherein the word-level weakly supervised classification model is the word-level data model for extraction of tasks from documents, wherein the word-level weakly supervised classification model is a Bidirectional Encoder Representations from Transformers (BERT-based classification model), wherein each instance is annotated with soft label and each instance is a combination of a word w, the word's POS tag p, and the sentence S.

2. The method of claim 1, wherein the word-level weakly supervised model is utilized for the extraction of tasks from a plurality of user documents based on a word-level weakly supervision task extraction technique, wherein the weakly supervision task extraction technique comprises:
   receiving the plurality of user documents for the extraction of tasks;
   pre-processing the plurality of user documents using the plurality of pre-processing techniques, to obtain a plurality of pre-processed user documents comprising a plurality of user sentences and a plurality of user words within the plurality of user sentences;
   labelling the plurality of user words from the plurality of pre-processed user documents as one of a task headword and a no-task headword using the word-level weakly supervised classification model; and
   expanding the labelled user task headword to obtain a task phrase based a phrase expansion technique and the plurality of dependency trees, wherein the task phrase represents the extracted task.

3. The method of claim 1, wherein the task extraction comprises identification of mentions of a task in a document, wherein a task is a well-defined knowledge-based action carried out volitionally with expertise for a specific goal within a pre-defined time by a single person, a group of persons, a device, or a system.

4. The method of claim 1, wherein the plurality of pre-processing techniques comprises (a) a sentence-splitting technique for identification of the plurality of sentences, (b) a tokenization technique for identification of the plurality of words within the plurality of sentences, (c) a Part of speech (POS) tagging technique for identification of the plurality of Part-of-speech (POS) tags for each word in the plurality of words, (d) a dependency parsing technique for identification of the plurality of dependency trees for the plurality of sentences, and (e) a WordNet® based features identification technique for identification of the plurality of WordNet® based features for the plurality of sentences.

5. The method of claim 1, wherein the plurality of words is labelled based on the plurality of linguistic rules for a non-negation aspect, an expertise aspect and a plurality of generic aspects.

6. The method of claim 5, wherein the plurality of linguistic rules for labelling the non-negation aspect labels the plurality of words based on a modified negation using the plurality of dependency trees, the plurality of linguistic rules for labelling the volitionality aspect labels the plurality of words based on identification of actions carried out volitionally, and the plurality of linguistic rules for labelling the expertise aspect labels the plurality of words based on a domain expertise or knowledge required for execution of the task.

7. A system comprising:
a memory storing instructions;
one or more communication interfaces; and
one or more hardware processors coupled to the memory via the one or more communication interfaces, wherein the one or more hardware processors are configured by the instructions to:
receive a plurality of documents from a plurality of sources, via one or more hardware processors;
pre-process the plurality of documents using a plurality of pre-processing techniques, via the one or more hardware processors, to obtain a plurality of pre-processed documents comprising a plurality of sentences, a plurality of words within the plurality of sentences, a plurality of Part-of-speech (POS) tags, a plurality of dependency trees and a plurality of WordNet® based features;
label the plurality of words from the plurality of pre-processed documents as one of a task headword and a no-task headword, via the one or more hardware processors, wherein the plurality of words is labelled based on the plurality of sentences using a plurality of linguistic rules, wherein the plurality of words is labelled based on the plurality of linguistic rules for a volitionality aspect referring to tasks whose actions are carried out by an actor volitionally,
wherein the volitionality aspect includes an action verbs or nouns aspect, an animate organization agent aspect, an inanimate agent aspect and a volition marker,
wherein the animate organization agent aspect captures the volitionality in an implicit way as animate agents indicate that the action corresponding to verb w is likely to be carried out volitionally,
wherein for the animate organization agent aspect, when the agent of the verb w is animate or corresponds to an organization, then the word is labelled as "task headword", wherein for the inanimate agent aspect, when the agent of the verb w is inanimate, then the word is labelled as "no task headword"; and
train a word-level weakly supervised classification model for extraction of tasks, via the one or more hardware processors, using the task headword and the no-task headword labelled using the plurality of linguistic rules, wherein the word-level weakly supervised classification model is the word-level data model for extraction of tasks from documents, wherein the word-level weakly supervised classification model is a Bidirectional Encoder Representations from Transformers (BERT-based classification model), and wherein each instance is annotated with soft labels, wherein each instance is a combination of a word w, the word's POS tag p, and the sentence S.

8. The system of claim 7, wherein the one or more hardware processors are configured by the instructions to perform the extraction of tasks from a plurality of user documents using the word-level weakly supervised model based on a word-level weakly supervision task extraction technique, wherein the weakly supervision task extraction technique comprises:
receiving the plurality of user documents for the extraction of tasks;
pre-processing the plurality of user documents using the plurality of pre-processing techniques, to obtain a plurality of pre-processed user documents comprising a plurality of user sentences and a plurality of user words within the plurality of user sentences;
labelling the plurality of user words from the plurality of pre-processed user documents as one of a task headword and a no-task headword using the word-level weakly supervised classification model; and
expanding the labelled user task headword to obtain a task phrase based a phrase expansion technique and the plurality of dependency trees, wherein the task phrase represents the extracted task.

9. The system of claim 7, wherein the one or more hardware processors are configured by the instructions to perform the task extraction comprising identification of mentions of a task in a document, wherein a task is a well-defined knowledge-based action carried out volitionally with expertise for a specific goal within a pre-defined time by a single person, a group of persons, a device, or a system.

10. The system of claim 7, wherein the one or more hardware processors are configured by the instructions to perform the plurality of pre-processing technique comprising (a) a sentence-splitting technique for identification of the plurality of sentences, (b) a tokenization technique for identification of the plurality of words within the plurality of sentences, (c) a Part of speech (POS) tagging technique for identification of the plurality of Part-of-speech (POS) tags for each word in the plurality of words, (d) a dependency parsing technique for identification of the plurality of dependency tree for the plurality of sentences, and a WordNet® based features identification technique for identification of the plurality of WordNet® based features for the plurality of sentences.

11. The system of claim 7, wherein the one or more hardware processors are configured by the instructions to perform labeling of the plurality of words based on the plurality of linguistic rules for a non-negation aspect, an expertise aspect and a plurality of generic aspects.

12. The system of claim 11, wherein the one or more hardware processors are configured by the instructions to perform the labelling of the plurality of words based on the plurality of linguistic rules incudes (a) the non-negation aspect labeling the plurality of words based on a modified by a negation using the dependency tree, (b) the volitionality aspect labeling the plurality of words based on identification of actions carried out volitionally, and the (c) the expertise aspect labeling the plurality of words based on a domain expertise or knowledge required for execution of the task.

13. A computer program product comprising a non-transitory computer readable medium having a computer readable program embodied therein, wherein the computer readable program, when executed on a computing device, causes the computing device to:

receive a plurality of documents from a plurality of sources, via one or more hardware processors;

pre-process the plurality of documents using a plurality of pre-processing techniques, via the one or more hardware processors, to obtain a plurality of pre-processed documents comprising a plurality of sentences, a plurality of words within the plurality of sentences, a plurality of Part-of-speech (POS) tags, a plurality of dependency trees and a plurality of WordNet® based features;

label the plurality of words from the plurality of pre-processed documents as one of a task headword and a no-task headword, via the one or more hardware processors, wherein the plurality of words is labelled based on the plurality of sentences using a plurality of linguistic rules, wherein the plurality of words is labelled based on the plurality of linguistic rules for a volitionality aspect referring to tasks whose actions are carried out by an actor volitionally, wherein the volitionality aspect includes an action verbs or nouns aspect, an animate organization agent aspect, an inanimate agent aspect and a volition marker, wherein the animate organization agent aspect captures the volitionality in an implicit way as animate agents indicate that the action corresponding to verb w is likely to be carried out volitionally, wherein for the animate organization agent aspect, when the agent of the verb w is animate or corresponds to an organization, then the word is labelled as "task headword", wherein for the inanimate agent aspect, when the agent of the verb w is inanimate, then the word is labelled as "no task headword"; and train a word-level weakly supervised classification model for extraction of tasks, via the one or more hardware processors, using the task headword and the no-task headword labelled using the plurality of linguistic rules, wherein the word-level weakly supervised classification model is the word-level data model for extraction of tasks from documents, wherein the word-level weakly supervised classification model is a Bidirectional Encoder Representations from Transformers (BERT-based classification model), and wherein each instance is annotated with soft labels, wherein each instance is a combination of a word w, the word's POS tag p, and the sentence S.

* * * * *